United States Patent
Neumann

(10) Patent No.: US 8,131,402 B2
(45) Date of Patent: Mar. 6, 2012

(54) SYSTEM FOR DETECTING PROXIMITY BETWEEN A WIND TURBINE BLADE AND A TOWER WALL

(75) Inventor: Ulrich Neumann, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 92 days.

(21) Appl. No.: 12/826,975

(22) Filed: Jun. 30, 2010

(65) Prior Publication Data

US 2011/0144815 A1 Jun. 16, 2011

(51) Int. Cl.
| | |
|---|---|
| G05D 3/12 | (2006.01) |
| G05D 5/00 | (2006.01) |
| F03D 9/00 | (2006.01) |
| H02P 9/04 | (2006.01) |
| B64C 11/00 | (2006.01) |
| B64C 27/00 | (2006.01) |
| F01D 5/18 | (2006.01) |
| F01D 5/00 | (2006.01) |
| F01D 25/00 | (2006.01) |
| B63H 3/00 | (2006.01) |
| B63H 1/00 | (2006.01) |

(52) U.S. Cl. .......... 700/287; 290/44; 290/55; 416/1; 416/42; 416/61

(58) Field of Classification Search .......... 700/287; 290/44, 55; 416/1, 42, 61

See application file for complete search history.

(56) References Cited

U.S. PATENT DOCUMENTS

| 6,619,918 | B1 | 9/2003 | Rebsdorf | |
|---|---|---|---|---|
| 6,940,185 | B2 * | 9/2005 | Andersen et al. | 290/44 |
| 7,059,822 | B2 | 6/2006 | LeMieux et al. | |
| 7,086,834 | B2 * | 8/2006 | LeMieux | 416/1 |
| 7,246,991 | B2 | 7/2007 | Bosche | |
| 7,755,210 | B2 * | 7/2010 | Kammer et al. | 290/44 |
| 2004/0057828 | A1 * | 3/2004 | Bosche | 416/1 |
| 2004/0201220 | A1 * | 10/2004 | Andersen et al. | 290/44 |
| 2005/0280412 | A1 | 12/2005 | Roeseler et al. | |
| 2008/0101930 | A1 * | 5/2008 | Bosche | 416/31 |
| 2009/0246019 | A1 * | 10/2009 | Volanthen et al. | 416/1 |
| 2010/0021298 | A1 * | 1/2010 | Sandvad | 416/1 |
| 2010/0140936 | A1 * | 6/2010 | Benito et al. | 290/44 |
| 2010/0209247 | A1 * | 8/2010 | Becker et al. | 416/1 |
| 2010/0253569 | A1 * | 10/2010 | Stiesdal | 342/118 |
| 2011/0018268 | A1 * | 1/2011 | Snel et al. | 290/44 |
| 2011/0135466 | A1 * | 6/2011 | Latorre et al. | 416/1 |

* cited by examiner

*Primary Examiner* — Ronald Hartman, Jr.
(74) *Attorney, Agent, or Firm* — Dority & Manning, P.A.

(57) ABSTRACT

A sensor system monitors deflection of turbine blades of a wind turbine. The system includes a first component configured on the turbine blades. A second component is configured on the tower at a height so as to detect the presence of the first component as the blades rotate past the tower. The second component generates a corresponding measurable parameter or value that is indicative of distance between the blades and tower. The second component is disposed substantially completely around the circumference of the tower so as to detect the first components at any rotational position of the turbine nacelle relative to the tower.

15 Claims, 3 Drawing Sheets

SYSTEM FOR DETECTING PROXIMITY BETWEEN A WIND TURBINE BLADE AND A TOWER WALL

FIELD OF THE INVENTION

The present subject matter relates generally to wind turbines, and more particularly to a system for detecting the proximity of the turbine blades relative to the in order to prevent a tower strike.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more turbine blades. The turbine blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

To ensure that wind power remains a viable energy source, efforts have been made to increase energy outputs by modifying the size and capacity of wind turbines. One such modification has been to increase the length of the turbine blades. However, as is generally known, the deflection of a turbine blade is a function of blade length, along with wind speed, turbine operating states and blade stiffness. Thus, longer turbine blades are subject to increased deflection forces, particularly when a wind turbine is operating in high wind speed conditions. These increased deflection forces not only produce fatigue on the turbine blades and other wind turbine components, but may also increase the risk of the turbine blades striking the tower. A tower strike can significantly damage a turbine blade and the tower and, in some instances, can even bring down the entire wind turbine.

Devices and systems are known for detecting turbine blade deflection using various types of active or mechanical sensors. U.S. Pat. No. 6,619,918 describes the use of fiber optic strain gauges on the turbine blades to measure load on the blades and to deduce tip clearance as a function of the measured load. U.S. Pat. No. 7,059,822 describes a system wherein beams are coupled to the blades and deflection of the blades is determined as a function of the amount of deflection of the beams. U.S. Pat. No. 7,246,991 describes a control system for avoiding a tower strike that uses a signal from a sensor that measures deflection of the turbine blades. Several possible sensor types are described, including strain gauges, accelerometers mounted in the blades, and active radar devices.

The conventional sensors and associated systems are relatively complex and costly, and calibrating such sensors can be quite complex and time consuming. Moreover, the sensors are generally limited to detecting the presence of the blade at a single circumferential location on the tower. However, the nacelle can assume virtually any rotational position relative to the tower, which may result in the blades passing the tower on the opposite side of the sensor (i.e., receiver or transmitter component) mounted on the tower.

Accordingly, there is a need for a blade deflection sensor system that is mechanically simple, robust, and provides reliable detection of the blade around the entire circumference of the tower.

BRIEF DESCRIPTION OF THE INVENTION

Aspects and advantages of the present subject matter will be set forth in part in the following description, or may be obvious from the description, or may be learned through practice of the invention.

In one aspect, a unique sensor system is provided for monitoring deflection of turbine blades of any manner of wind turbine that includes at least one blade mounted to a rotor hub supported by a nacelle atop a tower. The system includes a first component configured on each of the turbine blades and a second component configured on the tower at a height so as to detect the presence of the first component as the blades rotate past the tower. The second component generates a corresponding parameter or value, such as a voltage or current, which indicates the distance between the blades and tower. The second component is disposed substantially completely around the circumference of the tower so as to detect the blades at any rotational position of the nacelle relative to the tower.

The invention may utilize an active or passive detection system. For example, the first component may be any manner of active transmitter configured with the respective individual blades, with the second component including a circular array or receiver disposed around the tower. Alternatively, the second component may be the active component, and the first components may be passive receivers. Any manner of active system may be configured within the scope and spirit of the invention to provide complete detection coverage around the circumference of the tower.

In a particularly unique embodiment, the sensor system is completely passive. Desirably, power need not be supplied to either of the first or second components. For example, the system may be a passive inductive system wherein the measurable parameter or value (e.g., current, voltage, or other electrical property) is induced in the second component by the presence of the first components within a defined distance from the second component. In this embodiment, the first component may be a magnetic source attached to each of the turbine blades (e.g., a magnet embedded in the blade tips) and the second component may be a detector coil formed around the tower. The magnetic sources induce a current in the detector coil as they pass by the detector coil within a defined distance, with the magnitude of the current providing an indication of the distance between the blades and tower.

In still a further embodiment, a controller may be associated with the detector coil and configured to generate control signals to initiate action to avoid a blade strike when the distance between the blades and tower reaches a setpoint value.

In a further aspect, the invention may encompass a wind turbine including a tower, a nacelle rotatably mounted on top of the tower, and a rotor coupled to the nacelle that comprises a hub and at least one turbine blade extending outwardly from the hub. The wind turbine may include any manner of blade deflection sensor system discussed above and described in greater detail below.

These and other features, aspects and advantages of the present subject matter will become better understood with reference to the following description and appended claims. The accompanying drawings, which are incorporated in and constitute a part of this specification, illustrate embodiments of the present subject matter and, together with the description, serve to explain the principles of the present subject matter.

BRIEF DESCRIPTION OF THE DRAWING

A full and enabling disclosure of the present subject matter, including the best mode thereof, directed to one of ordinary skill in the art, is set forth in the specification, which makes reference to the appended figures, in which.

DETAILED DESCRIPTION OF THE INVENTION

Figure 1:
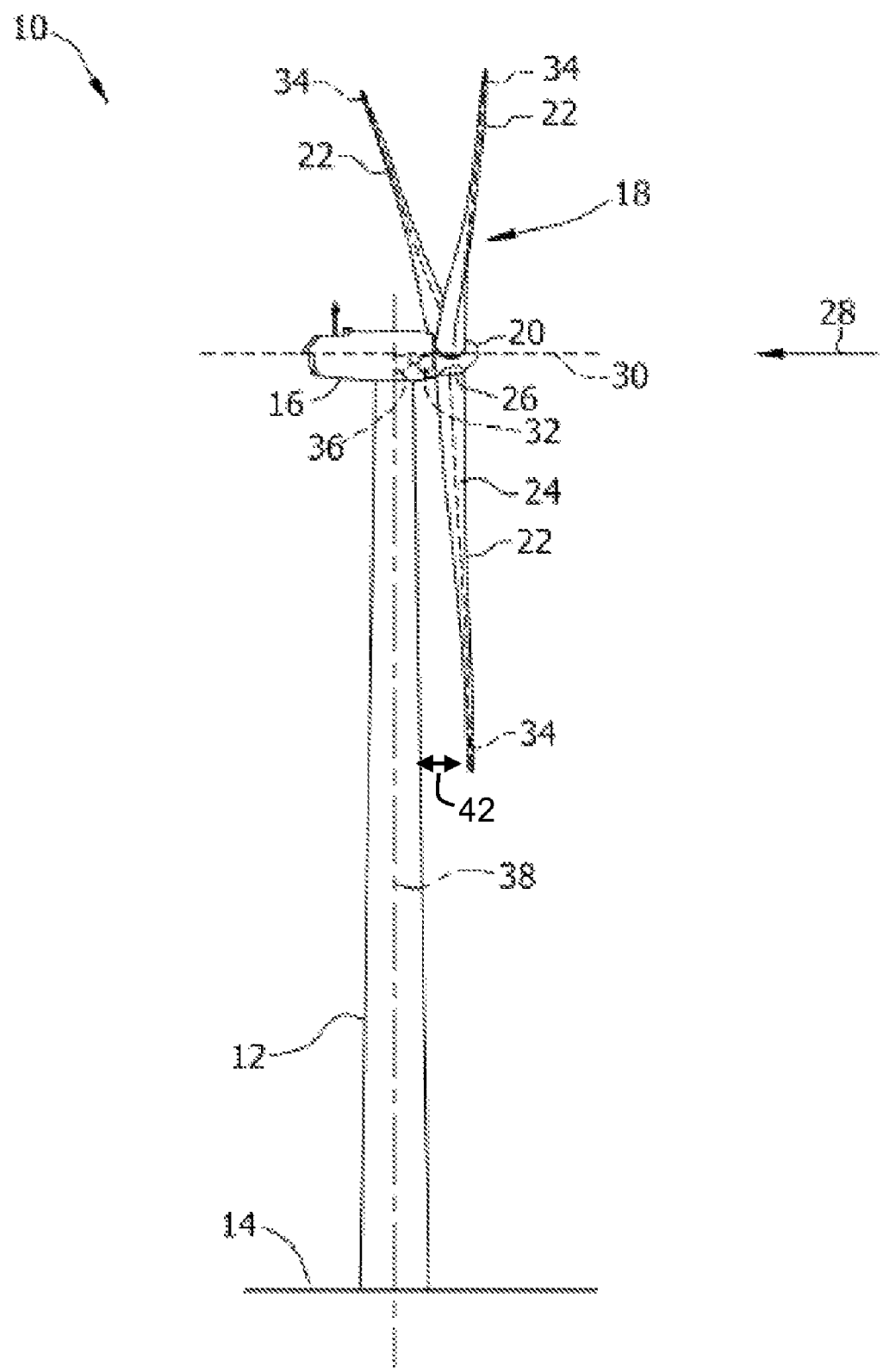
FIG. 1 provides a perspective view of a wind turbine.

Reference now will be made in detail to embodiments of the present subject matter, one or more examples of which are illustrated in the drawings. Each example is provided by way of explanation, not limitation of the present subject matter. In fact, it will be apparent to those skilled in the art that various modifications and variations can be made in the present subject matter without departing from the scope or spirit of the present subject matter. For instance, features illustrated or described as part of one embodiment can be used with another embodiment to yield a still further embodiment. Thus, it is intended that the present subject matter covers such modifications and variations as come within the scope of the appended claims and their equivalents.

FIG. 1 illustrates a perspective view of a horizontal-axis wind turbine 10. However, it should be appreciated that the wind turbine 10 may be a vertical-axis wind turbine. The wind turbine 10 includes a tower 12 that extends from a support system 14, a nacelle 16 mounted on the tower 12, and a rotor 18 that is coupled to the nacelle 16. The rotor 18 includes a rotatable hub 20 and one or more turbine blades 22 coupled to and extending outward from the hub 20. The tower 12 is fabricated from tubular metal, concrete, or any other suitable material and is configured on a support structure 14.

The turbine blades 22 may generally have any suitable length that enables the wind turbine 10 to function as designed. For example, the turbine blades 22 may have a length ranging from about 15 meters (m) to about 91 m. The turbine blades 22 are spaced about the hub 20 to facilitate rotating the rotor 18 to enable kinetic energy to be transferred from the wind into usable mechanical energy, and subsequently, electrical energy. Specifically, the hub 20 may be rotatably coupled to an electric generator (not illustrated) positioned within the nacelle 16 to permit electrical energy to be produced. Further, the turbine blades 22 may be mated to the hub 20 by coupling a blade root portion 24 to the hub 20 at a plurality of load transfer regions 26. Thus, any loads induced to the turbine blades 22 are transferred to the hub 20 via the load transfer regions 26.

As shown in the illustrated embodiment, the wind turbine 10 may also include a turbine control system or turbine controller 36 within the nacelle 16 or at any location on or in the wind turbine 10 or the support system 14. The controller 36 may be configured to control the various operating modes of the wind turbine 10 (e.g., start-up or shut-down sequences). Additionally, the controller 36 may be configured to control a pitch angle or blade pitch of each of the turbine blades relative to a pitch axis 34 via a pitch adjustment system 32 to control the load and power generated by the wind turbine 10 by adjusting an angular position of at least one turbine blade 22 relative to the wind. Further, as the direction 28 of the wind changes, the controller 36 may be configured to control a yaw direction of the nacelle 16 about a yaw axis 38 to position the turbine blades 22 with respect to the direction 28 of the wind. For example, the controller 36 may control a yaw drive mechanism 40 (FIGS. 2 and 3) of the nacelle 16 in order to rotate the nacelle 16 about the yaw axis 38.

During operation of the wind turbine 10, wind strikes the turbine blades 22 from a direction 28, which causes the rotor 18 to rotate about an axis of rotation 30. As the turbine blades 22 are rotated and subjected to centrifugal forces, they are also subjected to various forces and bending moments. As such, the turbine blades 22 may deflect from a neutral, or non-deflected, position to a deflected position. For example, the non-deflected blade clearance distance 42 (FIG. 1) represents the distance between the turbine blades 22 and the tower 12 when the blades 22 are in a non-deflected position. However, forces and bending moments acting on the turbine blades 22 may cause the blades 22 to deflect towards the tower 12, reducing the overall blade clearance 42. As aerodynamic loads increase, excessive forces and bending moments can cause one or more of the turbine blades 22 to strike the tower 12 resulting in significant damage and downtime.

Figure 2:
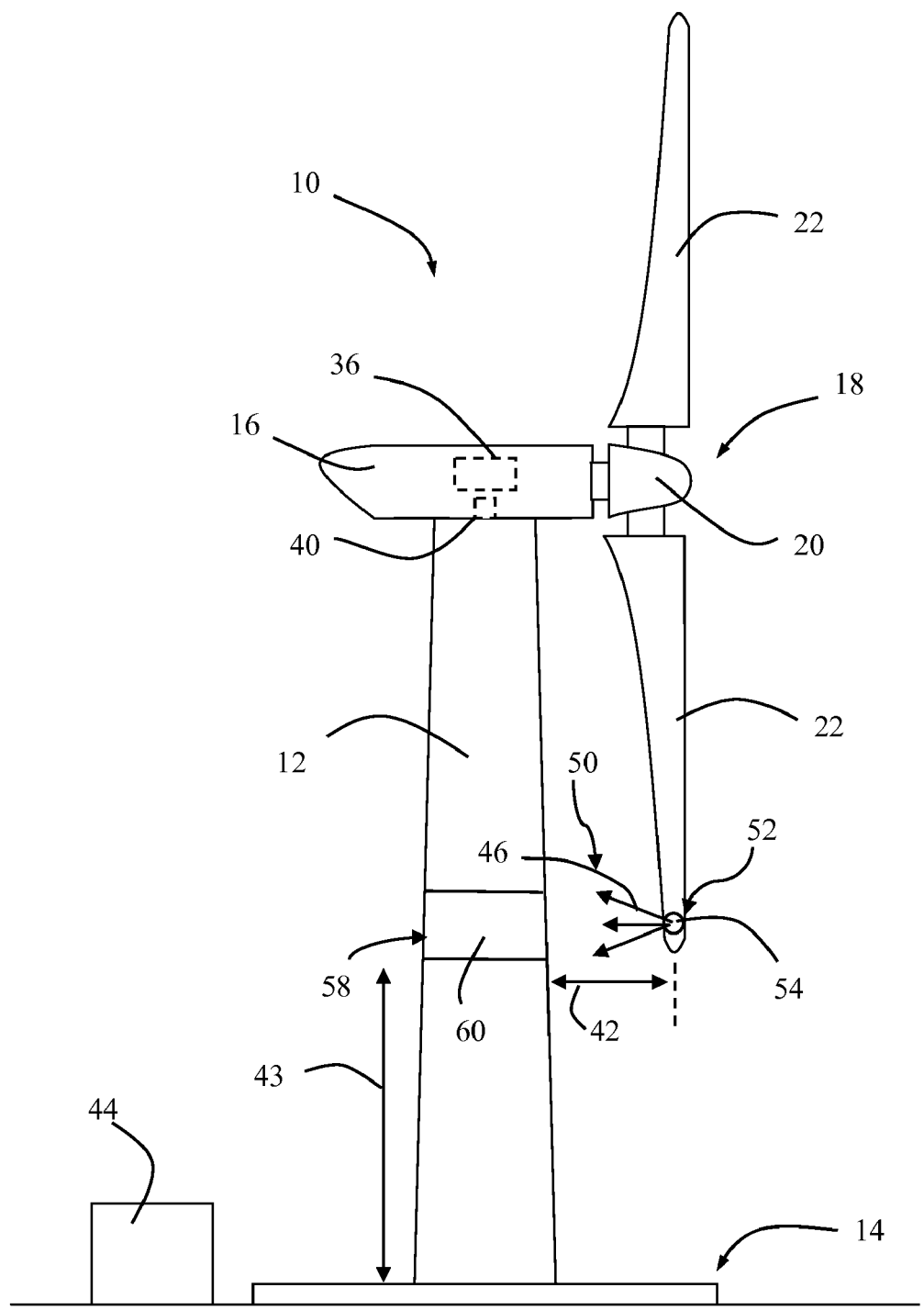
FIG. 2 provides a side view of a wind turbine in accordance with one embodiment of the present invention; and, FIG. 3 provides a side view of a wind turbine in accordance with another embodiment of the present invention.

FIG. 2 illustrates an embodiment of a sensor system 50 that may be configured with the wind turbine 10 for detecting the relative position of the blades 22 with respect to the tower 12 as the blades rotate past the tower 12. In this embodiment, the sensor system 50 includes a first component 52 configured on at least one the turbine blades 22. A second component 58 is configured on the tower 12 at a height 43 so as to detect the presence of the first component 52 as the blades 22 rotate past the tower 12, particularly the tip of the blade 22. The second component 58 generates a measurable parameter or value, such as a voltage, current, or other electrical property that is indicative of the clearance distance 42 between the blades 22 and tower 12. The second component 58 substantially completely surrounds the circumference of the tower 12 and is able to detect the blades (via the first components 52) around the entire perimeter of the second component so as to detect the blades 22 at any rotational position of the nacelle 16 relative to the tower 12.

The second component 58 has a range of detection so as to accommodate different heights at which the blade 22 may strike the tower. This strike height may vary depending on any number of factors, including blade pitch, yaw, load, and so forth.

The sensor system 50 may operate according to various detection principles. For example, the system 50 may be an active system wherein one of first 52 or second components 58 is an active transmitter and the other respective component is a passive receiver. In the embodiment illustrated in FIG. 2, the first components 52 are depicted as active devices 54 that transmit a signal (indicated by the arrows 46) that is received by the receiver 60 for processing. This type of active system may be a light-emitting system, acoustic system, radar system, and so forth.

In yet another embodiment, the sensor system 50 may be a passive system. In other words, detection of the blades at the position of the second component 58 is not dependent upon active transmission and receipt of a signal between the first and second components 52, 58. Desirably, the passive system need not supply power to either of the components 52, 58, which significantly simplifies and reduces the cost of the system 50.

Figure 3:
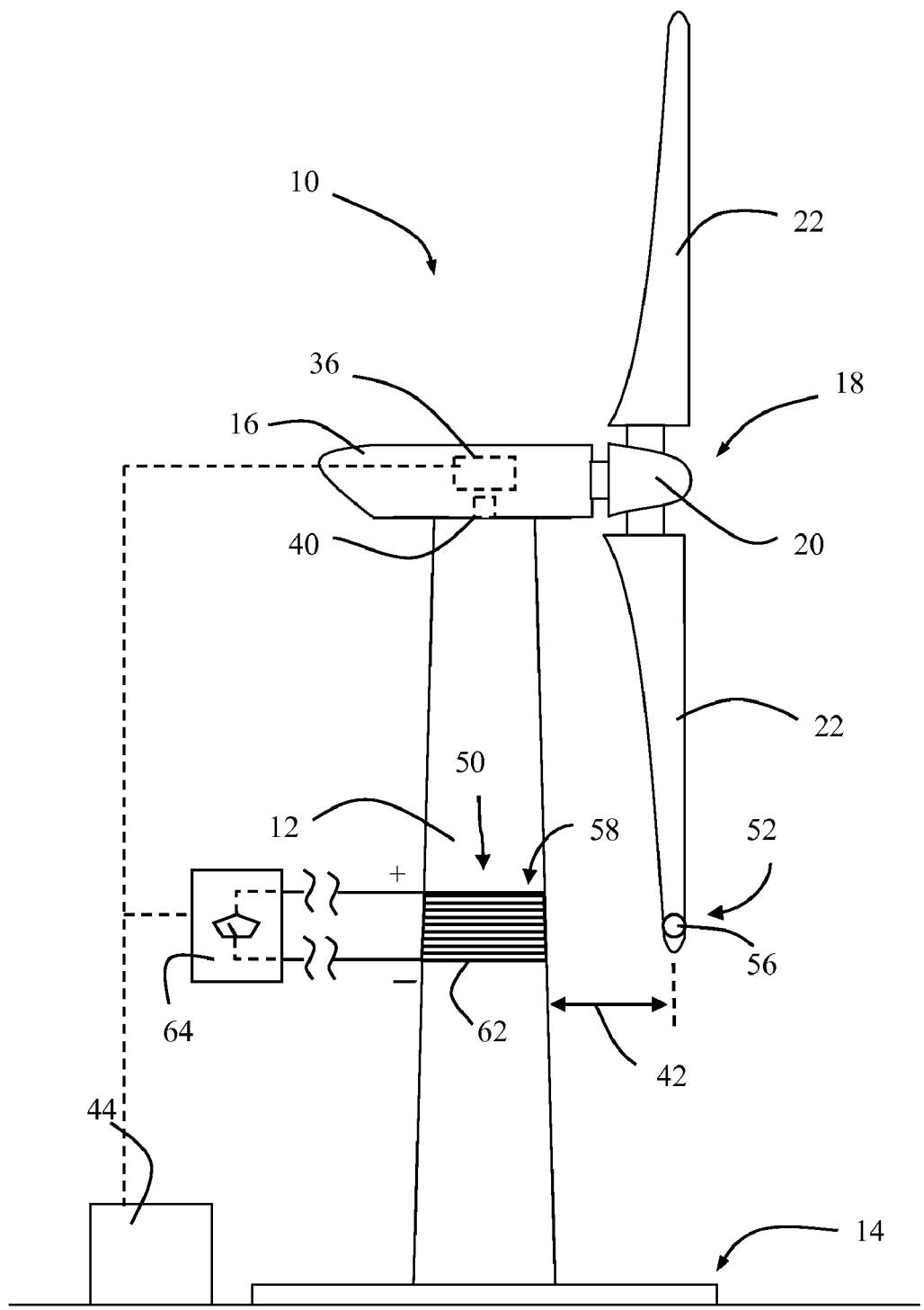

FIG. 3 illustrates a particularly unique passive sensor system 50 that operates in accordance with electromagnetic inductance principles. A measurable property is induced in the second component 58 by the presence of the first components 52 within a defined distance 42 from the tower 12. An electromagnetic induction system based on Faraday's law of induction is a well-know example of this principle. According to this principle, a varying magnetic field will induce a voltage in a coil (often referred to as a "search coil") that is proportional to the changing magnetic field in the coil. This induced voltage creates a current that is proportional to the rate of change of the field. The sensitivity of the search coil is dependent on the permeability of the core and the area and number of turns of the coil. Because search-coils work only when they are in a varying magnetic field, the search coils are generally not useful in a static or slowing changing magnetic field. However, they are particularly well suited for the present wind turbine embodiment wherein the speed of the blades relative to the tower (particularly the blade tip) is quite significant. In addition, the devices are inexpensive and easily configured with the wind turbine components.

Referring again to FIG. 3, the inductive sensor system 50 may include a magnetic source attached to each of the turbine blades 22. For example, an individual magnet 56 may be embedded in each blade 22 generally near the tip of the blade. A detector coil 62 is formed around the tower 12 at a height where the blade tip would contact the tower 12 in a blade strike. The magnet 56 may be powerful enough to ensure that, regardless of the blade pitch, it is detected by the coil 62. Alternatively, a plurality of magnets 56 may be disposed around the blade to ensure that the blade 22 is detected at any relative orientation. The coil 62 may be a plurality of copper wires wound around the tower 12, or may comprises a pre-made sleeve or other device that incorporates a coil and is fitted onto the tower 12. As the magnets 56 pass the coil 62, the voltage induced in the coil 62 produces a short but detectable and measurable current spike.

The magnitude of the current spike is indicative of the distance 42 between the blades 22 and tower 12 and may thus be used in a control system or circuitry that monitors blade clearance 42 and initiates corrective action in the event that the distance 42 approaches a dangerous limit. For example, FIG. 3 schematically depicts a controller 64 in communication with the coil 62. The controller 64 converts the current generated by the coil 62 into a control signal that may be passed to the turbine controller 36, which may act on the signal to perform a preventative corrective action to avoid a tower strike. Alternatively, the controller 36 may be configured to perform a corrective action reactively in response to blade deflection of one or more of the turbine blades 22 that exceeds a predetermined blade deflection threshold. Regardless, the corrective action may allow the wind turbine 10 to be adaptable to varying operating conditions which may otherwise result in significant aerodynamic loading on the turbine blades 22.

The extent or magnitude of blade deflection required for the controller 36 to perform a corrective action reactively may vary from wind turbine to wind turbine. For example, the predetermined blade deflection threshold may depend on the operating conditions of the wind turbine 10, the thickness of the turbine blades 22, the length of the turbine blades 22 and numerous other factors. In one embodiment, the predetermined blade deflection threshold of a turbine blade 22 may be equal to 70% of the non-deflected blade clearance 42. In the event that the controller 36 determines that the turbine blade deflection has exceeded this threshold, it can perform a corrective action to safeguard against a tower strike.

The corrective action performed by the controller 36 can take many forms. For example, the corrective action may include altering the blade pitch of one or more blades 22 for a partial or full revolution of the rotor 18. As indicated above, this may be accomplished by controlling a pitch adjustment system 32. Generally, altering the blade pitch of a turbine blade 22 reduces blade deflection by increasing out-of-plane stiffness.

In another embodiment, the corrective action may comprise modifying the blade loading on the wind turbine 10 by increasing the torque demand on the electrical generator (not illustrated) positioned within the nacelle 16. This reduces the rotational speed of the turbine blades 22, thereby potentially reducing the aerodynamic loads acting upon the surfaces of the blades 22.

Alternatively, the corrective action may include yawing the nacelle 16 to change the angle of the nacelle 16 relative to the direction 28 (FIG. 1) of the wind. A yaw drive mechanism 40 is typically used to change the angle of the nacelle 16 so that the turbine blades 22 are properly angled with respect to the prevailing wind. For example, pointing the leading edge of a turbine blade 22 upwind can reduce loading on the blade 22 as it passes the tower 12.

It should be readily appreciated, however, that the controller 36 need not perform one of the corrective actions described above and may generally perform any corrective action designed to reduce blade deflection. Additionally, the controller 36 may be configured to perform multiple corrective actions simultaneously, which may include one or more of the corrective actions described above.

Furthermore, the controller 36 may be configured to perform a particular corrective action in response to certain operating conditions and/or operating states of the wind turbine 10. Thus, in one embodiment, the controller 36 may be configured to selectively perform a particular corrective action depending upon the magnitude of the blade deflection of the turbine blades 22. For example, during certain wind conditions, turbine blade deflection may be most effectively reduced by altering the blade pitch of the turbine blades 22. Accordingly, during such conditions, the controller 36 may be configured to alter the blade pitch of one or more of the turbine blades 22 when the determined blade deflection exceeds a predetermined level, such as a predetermined percentage of the non-deflected blade clearance. However, in the event that blade deflection is below this predetermined level, it may be desirable for the controller to perform a different corrective action. This may be desirable, for example, when an alternative corrective action can sufficiently reduce blade deflection while causing less of an impact on the amount of power generated by the wind turbine 10. Accordingly, such a configuration can improve the efficiency of a wind turbine 10 by ensuring that the corrective action performed is proportional to the severity of the blade deflection.

It should also be appreciated that the system described above may be installed in a plurality of wind turbines 10 located within close proximity to each other, for example in a wind park. In such an embodiment, each wind turbine 10 may be in communication with a park controller 44 by any suitable means. For example, transmission lines (not illustrated) may be used to connect the controller 36 to the park controller 44.

The park controller 44 may be generally configured to issue a control command to override the control of any or all of the turbine controllers 36 in a wind park in order to change or alter the operating mode of any number of the wind turbines. Specifically, the park controller 44 may be configured to command a single wind turbine 10, particular groups of wind turbines, or all of the wind turbines in a wind park to enter into a particular operating mode in order to adapt the wind turbine(s) to changing operating conditions. In other words, the park controller 44 may alter operating modes of the wind turbine(s) to react proactively to new operating conditions (e.g. excessive wind deviations) to achieve maximum power generation while safeguarding the turbines.

It should be further appreciated that the present invention encompasses any manner of wind turbine 10 that incorporates a sensor system 50 in accordance with aspects described herein.

This written description uses examples to disclose the present subject matter, including the best mode, and also to enable any person skilled in the art to practice the present subject matter, including making and using any devices or systems and performing any incorporated methods. The patentable scope of the present subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A sensor system for monitoring deflection of a turbine blade of a wind turbine, said system comprising:
a first component configured on the turbine blade; and,
a second component configured on a tower at a height so as to detect the presence of said first component as the blade rotates past the tower and generates a corresponding measurable parameter, said second component disposed substantially completely around the circumference of the tower so as to detect said first component at any rotational position of a nacelle relative to the tower.

2. The sensor system as in claim 1, wherein said system is an active system with one of said first or second components comprising an active transmitter and the other of said first or second component comprising a passive receiver.

3. The sensor system as in claim 1, wherein said system is a passive system.

4. The sensor system as in claim 3, wherein said system is a passive inductive system wherein the measurable parameter is induced in said second component by the presence of said first components within a defined distance.

5. The sensor system as in claim 4, wherein said first component comprises a magnetic source attached to said turbine blade, and said second component comprises a detector coil formed around the tower, said magnetic sources inducing a detectable current in said detector coil as said magnetic sources pass by said detector coil within a defined distance.

6. The sensor system as in claim 5, further comprising a controller associated with said detector coil to determine distance between the blades and tower as a function of the magnitude of the induced current.

7. The sensor system as in claim 6, wherein said controller is further configured to generate control signals to initiate action to avoid a blade strike when the distance between the blade and tower reaches a setpoint value.

8. The sensor system as in claim 5, wherein said magnetic source comprises individual magnets embedded in a tip of the turbine blade at a location so as to face the tower in a full load condition of the blade.

9. The sensor system as in claim 5, wherein said detector coil comprises wire windings formed around the tower.

10. A wind turbine, comprising:
a tower;
a nacelle atop said tower, said nacelle rotatable relative to said tower;
at least one turbine blade mounted to a rotor hub; and,
a blade deflection sensor system, comprising:
a first component configured on said turbine blade; and,
a second component configured on said tower at a height so as to detect the presence of said first component as said blade rotates past said tower and generates a corresponding measurable parameter, said second component disposed substantially completely around the circumference of said tower so as to detect said first component at any rotational position of said nacelle relative to said tower.

11. The wind turbine as in claim 10, wherein said sensor system is a passive inductive system that does not require power to be supplied to either of said first or second components, wherein the measurable parameter is induced in said second component by the presence of said first component within a defined distance from said second component.

12. The wind turbine as in claim 11, wherein said first component comprises a magnetic source attached to said turbine blade, and said second component comprises a detector coil formed around said tower, said magnetic sources inducing a measurable current in said detector coil as said magnetic sources pass by said detector coil within the defined distance.

13. The wind turbine as in claim 12, further comprising a controller associated with said detector coil to determine distance between said turbine blades and said tower as a function of the magnitude of a current induced in said detector coil.

14. The wind turbine as in claim 13, wherein said controller is further configured to generate control signals to initiate action to avoid a blade strike when the distance between said blades and said tower reaches a setpoint value.

15. The wind turbine as in claim 12, wherein said magnetic source comprises an individual magnet embedded in a tip region of said turbine blade at a location so as to face said tower in a full load condition of said blade.

* * * * *